United States Patent
Sakai

(10) Patent No.: US 9,142,211 B2
(45) Date of Patent: Sep. 22, 2015

(54) SPEECH RECOGNITION APPARATUS, SPEECH RECOGNITION METHOD, AND COMPUTER-READABLE RECORDING MEDIUM

(71) Applicant: NEC Corporation, Minato-ku, Tokyo, Japan (JP)

(72) Inventor: Atsunori Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 232 days.

(21) Appl. No.: 13/766,247

(22) Filed: Feb. 13, 2013

(65) Prior Publication Data

US 2013/0211822 A1 Aug. 15, 2013

(30) Foreign Application Priority Data

Feb. 14, 2012 (JP) .................................. 2012-029207

(51) Int. Cl.
- *G06F 17/27* (2006.01)
- *G10L 15/18* (2013.01)
- *G10L 15/06* (2013.01)

(52) U.S. Cl.
CPC ........ *G10L 15/1815* (2013.01); *G06F 17/2785* (2013.01); *G06F 17/274* (2013.01); *G10L 15/063* (2013.01)

(58) Field of Classification Search
USPC ............... 704/4, 10, 205, 231, 235, 236, 237, 704/240, 245, 246, 255, 268, 9, 243, 244, 704/257
See application file for complete search history.

(56) References Cited

U.S. PATENT DOCUMENTS

| | | | |
|---|---|---|---|
| 7,310,601 B2 * | 12/2007 | Nishizaki et al. | 704/240 |
| 2009/0024392 A1 * | 1/2009 | Koshinaka | 704/257 |
| 2010/0191530 A1 | 7/2010 | Nakano et al. | |
| 2011/0004462 A1 * | 1/2011 | Houghton et al. | 704/9 |

FOREIGN PATENT DOCUMENTS

| | | | |
|---|---|---|---|
| JP | 2001100783 A | 4/2001 | |
| JP | 2002091484 A | 3/2002 | |
| JP | 2010170137 A | 8/2010 | |

* cited by examiner

*Primary Examiner* — Vu B Hang
(74) *Attorney, Agent, or Firm* — Sughrue Mion, PLLC

(57) ABSTRACT

A speech recognition apparatus 20 includes: an identification language model creation unit 21 that selects, from learning texts 27 for various fields for generating language models 26 for the fields, a phrase that includes a word whose appearance frequency satisfies a set condition on a field-by-field basis, and generates an identification language model 25 for identifying the field of speech using the selected phrases; a speech recognition unit 22 that executes speech recognition on the speech using the identification language model 25, and outputs text data and word confidences as a recognition result; and a field determination unit 23 that specifies a field that includes the most words whose confidences are greater than or equal to a set value based on the text data, the word confidences, and the words in the learning texts for the fields, and determines that the specified field is the field of the speech.

9 Claims, 9 Drawing Sheets

FIG. 4

Field-specific appearance frequency lists

Appearance frequency list 214

| Word | Relative frequency |
|---|---|
| Prescription | 2.050% |
| Dosage | 1.534% |
| Drug | 1.119% |
| | |
| | |

Appearance frequency list 214

| Word | Relative frequency |
|---|---|
| Account | 1.825% |
| Open | 1.602% |
| Teller | 0.980% |
| | |
| | |

Appearance frequency list 214

| Word | Relative frequency |
|---|---|
| Line | 1.560% |
| Setup | 1.422% |
| Computer | 1.103% |
| | |
| | |

. . .

| Common words |
|---|
| Phone |
| Inquiry |
| Check |
| Associate |
| |

*Words such as particles, adjectives, adverbs, and verbs are removed. Narrowed down to only nouns (proper nouns etc.)

*Words included in other fields as well are removed from appearance frequency lists.

Field specific condition-satisfying phrase lists

Ex.: I wrote a drug prescription.

SPEECH RECOGNITION APPARATUS, SPEECH RECOGNITION METHOD, AND COMPUTER-READABLE RECORDING MEDIUM

CROSS-REFERENCE TO RELATED APPLICATION

This application is based upon and claims the benefit of priority from Japanese patent application No. 2012-29207, filed on Feb. 14, 2012, the disclosure of which is incorporated herein in its entirety by reference.

BACKGROUND OF THE INVENTION

1. Field of the Invention

The present invention relates to a speech recognition apparatus and a speech recognition method for executing voice recognition on input speech, and also relates to a computer-readable recording medium having recorded thereon a program for realizing the apparatus and method.

2. Description of Related Art

Conventionally, dictionaries for speech recognition called language models are used in speech recognition. Also, the recognition accuracy of speech recognition currently tends to falls relative to a rise in the number of parameters in the learning texts used in the creation of a dictionary. Accordingly, instead of having general-purpose dictionaries that allow recognition with any language, the area in which a dictionary is to be applied is limited to a certain extent, and language models are created and used with focus on a certain field.

In order to improve recognition accuracy under these circumstances, JP 2001-100783A, JP 2002-091484A, and JP 2010-170137A disclose techniques for performing speech recognition using multiple language models.

For example, according to the technique disclosed in JP 2001-100783A, firstly, multiple language models are created by adding example phrases regarding specific topics to the respective language models. Next, speech recognition is performed using those language models, and then the most likely recognition result is selected from among the recognition results.

Also, according to the technique disclosed in JP 2002-091484A, firstly, tree-structure clustering is performed on learning text data, and thus the learning text data is divided into multiple clusters such that each cluster has linguistically analogous properties. Next, a language model is created for each cluster, speech recognition is performed using each language model, and then the word string (recognition result) that has the highest likelihood is output.

Furthermore, according to the technique disclosed in JP 2010-170137A, firstly, speech recognition is performed using multiple language models that are different from each other, and a confidence is calculated in units of utterances. Next, the recognition result having the highest confidence is selected, and the selected recognition result is output.

However, the technique disclosed in JP 2001-100783A and the technique disclosed in JP 2002-091484A have the problem that they are only useful with speech whose field is known in advance. For this reason, when the field of input speech is unknown, it is necessary for someone to recognize the field in advance by listening to the speech and then prepare a language model or learning text data in the corresponding field. Also, in order to implement speech recognition using batch processing when there is a large number of speech files in different fields, it is necessary to classify the speech files by field in advance, and then prepare corresponding language models.

However, according to the technique disclosed in JP 2010-170137A, it is conceivable to be able to handle speech whose field is not known in advance if as many language models as possible are prepared, but as the number of language models rises, there ends up being a rise in the number of speech recognition engines that operate at the same time. This results in the possibility of an excessive rise in the processing load borne by the system during speech recognition.

Although it is conceivable to solve the above-described problems by automatically identifying the field of input speech and selecting a language model in the appropriate field, the reality is that a technique for automatically identifying the field of input speech does not exist.

SUMMARY OF THE INVENTION

One example of an object of the present invention is to provide a speech recognition apparatus, a speech recognition method, and a computer-readable recording medium that resolve the aforementioned problems by being able to identify the field that input speech is related to while suppressing an increase in the processing load.

In order to achieve the aforementioned object, a speech recognition apparatus according to one aspect of the present invention includes: an identification language model creation unit that selects, from learning texts for a plurality of fields for generating language models for the fields, a phrase that includes a word whose appearance frequency satisfies a set condition on a field-by-field basis, and generates an identification language model for identifying the field of input speech using the selected phrases;

a speech recognition unit that executes speech recognition on the input speech using the identification language model, and outputs text data and a confidence for each word included in the text data as a recognition result; and a field determination unit that specifies a field that includes the most words whose confidences are greater than or equal to a set value based on the text data, the confidences of the words, and the words included in the learning texts for the fields, and determines that the specified field is the field of the input speech.

Also, in order to achieve the aforementioned object, a speech recognition method according to one aspect of the present invention includes the steps of (a) selecting, from learning texts for a plurality of fields for generating language models for the fields, a phrase that includes a word whose appearance frequency satisfies a set condition on a field-by-field basis, and generating an identification language model for identifying the field of input speech using the selected phrases;

(b) executing speech recognition on the input speech using the identification language model, and outputting text data and a confidence for each word included in the text data as a recognition result; and (c) specifying a field that includes the most words whose confidences are greater than or equal to a set value based on the text data, the confidences of the words, and the words included in the learning texts for the fields, and determining that the specified field is the field of the input speech.

Furthermore, in order to achieve the aforementioned object, a computer-readable recording medium according to one aspect of the present invention has recorded thereon a program containing instructions for causing a computer to execute the steps of:

(a) selecting, from learning texts for a plurality of fields for generating language models for the fields, a phrase that includes a word whose appearance frequency satisfies a set condition on a field-by-field basis, and generating an identification language model for identifying the field of input speech using the selected phrases;

(b) executing speech recognition on the input speech using the identification language model, and outputting text data and a confidence for each word included in the text data as a recognition result; and (c) specifying a field that includes the most words whose confidences are greater than or equal to a set value based on the text data, the confidences of the words, and the words included in the learning texts for the fields, and determining that the specified field is the field of the input speech.

In this way, according to the present invention, it is possible to identify the field that input speech is related to while suppressing an increase in the processing load.

BRIEF DESCRIPTION OF THE DRAWINGS

FIG. 4 is a diagram showing an example of appearance frequency lists according to the embodiment of the present invention.

EXEMPLARY EMBODIMENT

Explanation of Terms

First, the main terms used in the following embodiment of the present invention will be described below. To begin with, "language model" refers to a statistical model that is a collection of words and information indicating their arrangement. The n-gram model is one specific example of a statistical model.

Also, a language model expresses constraints regarding word arrangement, thus making it possible to narrow down the vocabulary targeted for recognition by predicting words that can be spoken next. Furthermore, a language model is created based on a learning text obtained by converting actually spoken speech into text.

The term "appearance frequency" refers to the number of times that each word appears in the learning text (text data) used to create the above-described language model.

The "confidence" of words, which is output as a recognition result, is a statistical probability (see the documents listed below) including a probability calculated based on an acoustic model (probability calculated from the viewpoint of sound), which is a dictionary of sounds, and a probability calculated based on a language model (probability calculated based on a model of connections between words in a phrase). A speech recognition apparatus outputs the higher one of these two probabilities as the confidence.

REFERENCE DOCUMENTS

JP 2005-275348A
JP 2011-017818A
Lee, Akinobu, Tatusya Kawahara, and Kiyohiro Shikano. "Real-Time Confidence Scoring Based on Word Posterior Probability on two-pass search algorithm" IPSJ SIG Technical Report, 2003-SLP-49-48, December 2003

Embodiment

Hereinafter, a speech recognition apparatus, speech recognition method, and program of an embodiment of the present invention will be described with reference to FIGS. 1 to 9.

Overview of Apparatus Configuration

Figure 1:
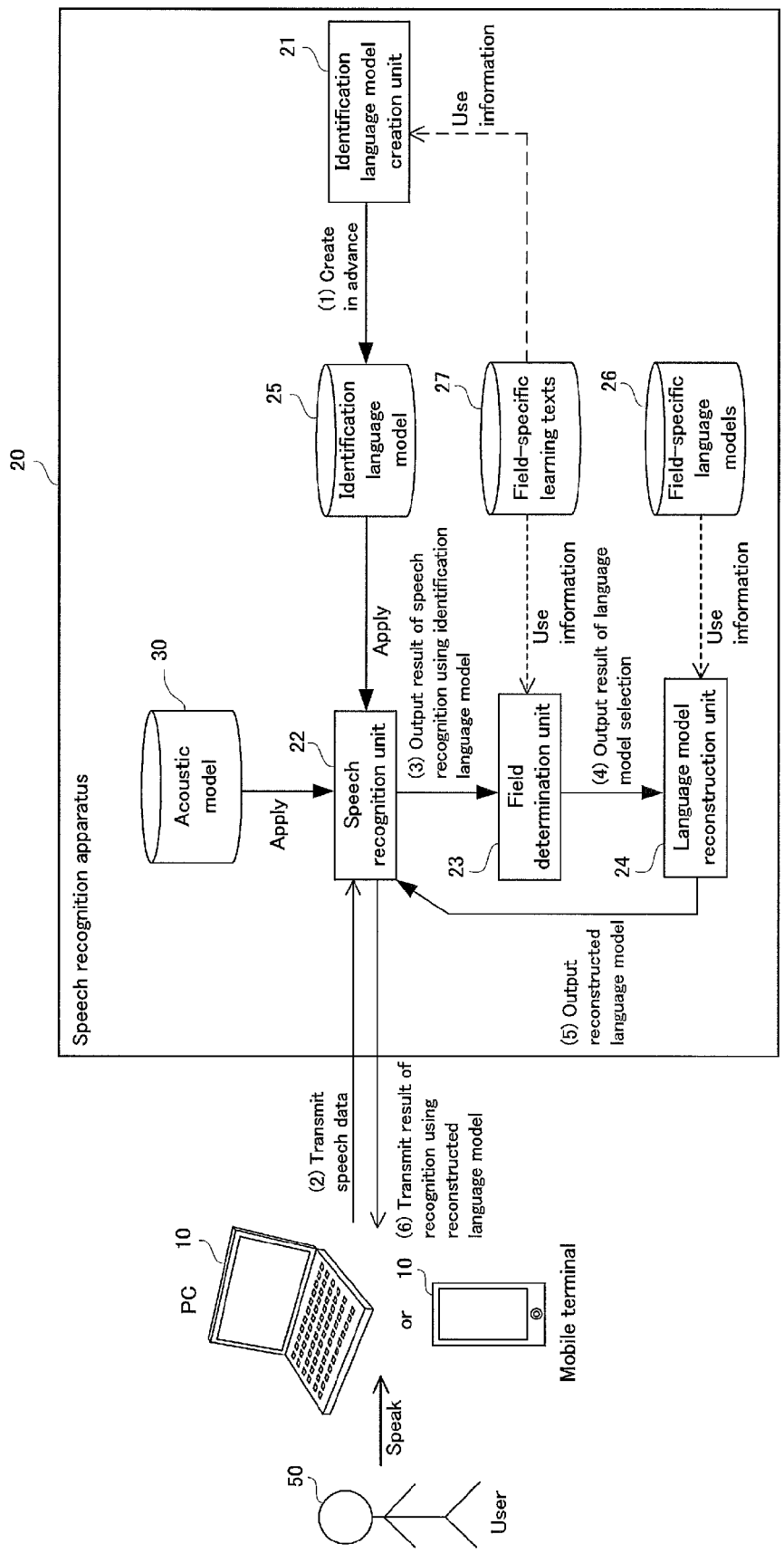
FIG. 1 is a block diagram showing a schematic configuration of a speech recognition apparatus according to an embodiment of the present invention.

First, the schematic configuration of the speech recognition apparatus of the present embodiment will be described with reference to FIG. 1. FIG. 1 is a block diagram showing the schematic configuration of the speech recognition apparatus of this embodiment of the present invention.

As shown in FIG. 1, a speech recognition apparatus 20 of the present embodiment includes an identification language model creation unit 21, a speech recognition unit 22, and a field determination unit 23. In the present embodiment, the speech recognition apparatus 20 is connected to a terminal 10, and a user 50 inputs speech to the terminal 10. In this case, the terminal 10 transmits speech data to the speech recognition apparatus 20.

First, in the speech recognition apparatus 20, phrases that include words whose appearance frequency satisfies a set condition (referred to hereinafter as "condition-satisfying phrases") are selected on a field-by-field basis by the identification language model creation unit 21 from learning texts 27 for various fields (referred to hereinafter as "field-specific learning texts"), which are for the generation of multiple language models 26 for respective fields (referred to hereinafter as "field-specific language models"). The identification language model creation unit 21 then uses the condition-satisfying phrases that were selected on a field-by-field basis to generate an identification language model 25 for identifying the field of input speech.

The speech recognition unit 22 receives speech and executes speech recognition on the input speech using the identification language model 25 and an acoustic model 30. The speech recognition unit 22 then outputs a recognition result that includes text data (referred to hereinafter as "recognition result text") and confidences for the words included in the recognition result text.

The field determination unit 23 then specifies the field that includes the most words whose confidences are greater than or equal to a set value based on the recognition result text, the confidences of the words, and the words included in the learning texts for various fields (field-specific learning texts 27), and determines that the specified field is the field of the input speech.

Specifically, the field determination unit 23 compares words that have a high confidence among the words in the recognition result text with words that have a high appearance frequency in the learning texts for the language models in various fields, and determines, based on the comparison result, that the field with the most matching words is the field of the speech.

In this way, according to the present embodiment, the speech recognition apparatus 20 judges which field includes the most words that have a high confidence, and determines the field of the input speech based on the judgment result. The determination result is appropriate because, as described above, the confidence is obtained based on an audio probability of the input speech calculated based on the acoustic model 30 and a probability calculated based on word arrangement according to the identification language model 25.

Also, the identification language model 25 used in the speech recognition for field determination is created using less learning data than that used for the field-specific language models 26. Accordingly, the processing load on the speech recognition apparatus 20 in speech recognition for field determination is lower than that in the case of using any of the field-specific language models 26.

As shown in FIG. 1, the speech recognition apparatus 20 of the present embodiment can further include a language model reconstruction unit 24. The language model reconstruction unit 24 first acquires the condition-satisfying phrases that were selected by the identification language model creation unit 21 for the fields other than the field determined to be the field of the input speech.

The language model reconstruction unit 24 then adds the acquired condition-satisfying phrases, as learning text, to the language model in the field determined to be the field of the input speech, and reconstructs the language model in that field. Note that the reconstructed language model is referred to hereinafter as a "customized language model" 29.

In this case, the speech recognition unit 22 again executes speech recognition on the input speech using the customized language model 29 that was reconstructed by the language model reconstruction unit 24.

In this way, the language model reconstruction unit 24 creates an ideal language model (customized language model 29) that is more suited to the input speech, and therefore executing speech recognition using this language model achieves an improvement in recognition accuracy over that in conventional techniques (see JP 2001-10078A, JP 2002-091484A, and JP 2010-170137A).

Also, in the present embodiment, the speech recognition unit 22 can acquire the language model in the field determined to be the field of the input speech from among the field-specific language models 25, and perform speech recognition on the input speech using the acquired language model. An improvement in recognition accuracy is achieved even in this case since the selection of a language model in the wrong field is avoided. The processing speed is also improved in this case.

Furthermore, although speech recognition is executed two times in the present embodiment as described above, there is no need to operate multiple speech recognition engines at the same time, unlike the technique disclosed in JP 2010-170137A, and therefore the processing load on the speech recognition apparatus 20 is reduced in comparison with the technique disclosed in JP 2010-170137A.

Specific Example of Apparatus Configuration

Figure 2:
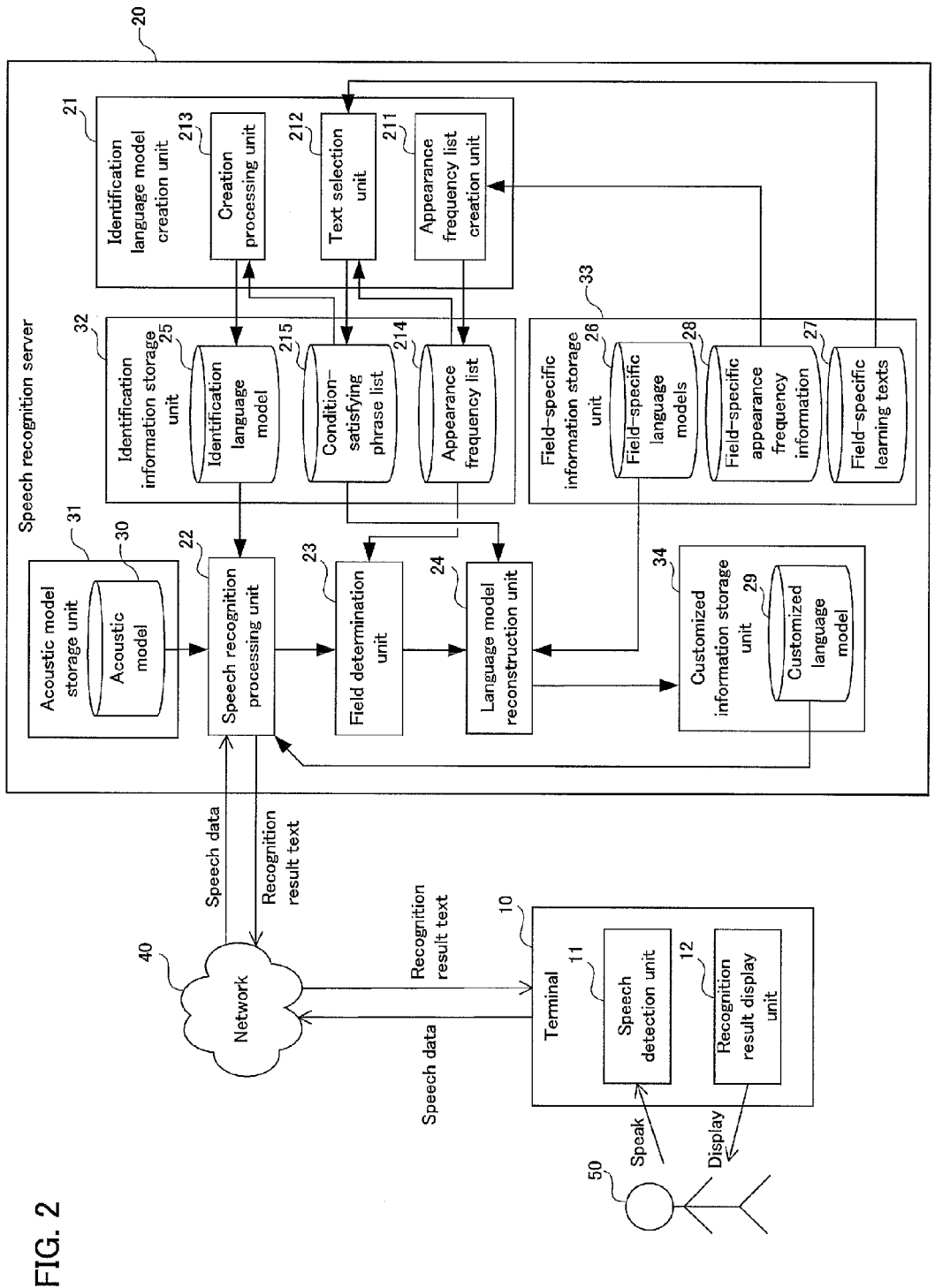
FIG. 2 is a block diagram showing a specific configuration of the speech recognition apparatus according to the embodiment of the present invention.

Next, the configuration of the speech recognition apparatus of the present embodiment will be described in further detail with reference to FIGS. 2 to 5. FIG. 2 is a block diagram showing the specific configuration of the speech recognition apparatus of this embodiment of the present invention.

As shown in FIG. 2, in addition to the identification language model creation unit 21, the speech recognition unit 22, the field determination unit 23, and the language model reconstruction unit 24, the speech recognition apparatus 20 of the present embodiment includes an acoustic model storage unit 31, an identification information storage unit 32, a field-specific information storage unit 33, and a customized information storage unit 34.

The acoustic model storage unit 31 stores the acoustic model 30 shown in FIG. 1. The customized information storage unit 34 stores the customized language model 29 shown in FIG. 1. The identification information storage unit 32 stores the identification language model 25 shown in FIG. 1, as well as an appearance frequency list 214 and a condition-satisfying phrase list 215. The appearance frequency list 214 and the condition-satisfying phrase list 215 will be described later.

The field-specific information storage unit 33 stores the field-specific language model 26 and the field-specific learning text 27 shown in FIG. 1, as well as field-specific appearance frequency information 28. The field-specific appearance frequency information 28 is information that specifies the appearance frequencies of words that appear in learning texts on a field-by-field basis. The word appearance frequencies are normally calculated at the time of language model creation, and the field-specific appearance frequency information 28 is output in the process of the creation of the field-specific language models 26.

Figure 3:
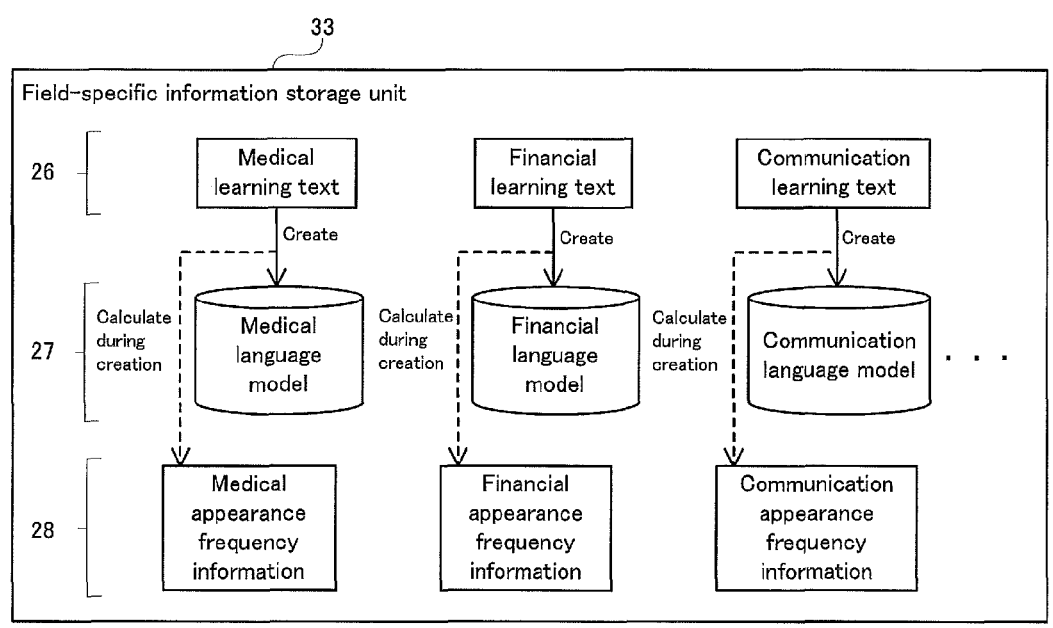
FIG. 3 is a diagram showing an example of information stored in a field-specific information storage unit shown in FIG. 2.

The information stored in the field-specific information storage unit 33 will now be described with reference to FIG. 3. FIG. 3 is a diagram showing an example of information stored in the field-specific information storage unit shown in FIG. 2. As shown in FIG. 3, in the present embodiment, the field-specific information storage unit 33 stores a language model, learning text, and appearance frequency information for each field.

FIG. 3 shows "medical", "financial", and "communication" as examples of fields, but the number of fields is not limited to this. There are also no particular limitations on the fields, and the fields can be set freely. For example, the fields may be set to industries such as finance, medicine, and communication as described above, or may be set to dialects such as the Kansai dialect and the Hakata dialect.

As shown in FIG. 2, the identification language model creation unit 21 of the present embodiment includes an appearance frequency list creation unit 211, a text selection unit 212, and a creation processing unit 213. The appearance frequency list creation unit 211 generates an appearance frequency list 214 for each field using the field-specific learning texts 27, and stores the generated appearance frequency lists 214 in the identification information storage unit 32.

Specifically, the appearance frequency list creation unit 211 first acquires the field-specific appearance frequency information 28 (see FIG. 3) from the field-specific information storage unit 33, and creates an appearance frequency list 214 for each field based on the word appearance frequencies specified in the acquired the appearance frequency information.

More specifically, as shown in FIG. 4, the appearance frequency list creation unit 211 obtains a relative frequency for each word based on the appearance frequencies, and creates an appearance frequency list 214 for each field by arranging the words in descending order of relative frequency. Note that the relative frequency may be a relative frequency within a field, or may be a relative frequency with respect to all of the fields. There is no particular limitation on the method for calculating the relative frequencies. FIG. 4 is a diagram showing an example of appearance frequency lists of this embodiment of the present invention.

Next, in order to make the created appearance frequency lists 214 be lists of only characteristic words in the respective fields, the appearance frequency list creation unit 211 omits words that are parts of speech such as particles, adjectives, adverbs, and verbs from the words in the appearance frequency lists 214 so as to make the appearance frequency lists 214 be lists of only nouns (e.g., proper nouns) (see FIG. 4).

Next, the appearance frequency list creation unit 211 further removes words that appear in the learning texts for different fields from the appearance frequency lists 214 that include only nouns, and stores the resulting appearance frequency lists 214 in the identification information storage unit 32 (see FIG. 4). Note that the words targeted for removal need not be all of the words that appear in the learning texts for different fields, but rather may be only the words whose relative frequencies are greater than or equal to a set value in the appearance frequency lists 214. In this case, the set value is set such that later-described field determination is performed appropriately.

The text selection unit 212 first acquires the appearance frequency lists 214 from the identification information storage unit 32, and also acquires the field-specific learning texts 27 from the field-specific information storage unit 33. The text selection unit 212 then specifies the words whose appearance frequencies satisfy a set condition, such as words whose relative frequencies are greater than or equal to a set value (referred to hereinafter as "high appearance frequency words"), in the appearance frequency lists 214 on a field-by-field basis. Note that in this case as well, the set value is set such that later described field determination is performed appropriately.

Figure 5:
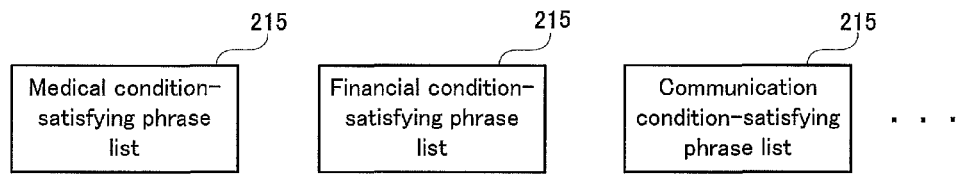
FIG. 5 is a diagram showing an example of condition-satisfying phrase lists according to the embodiment of the present invention.

Next, the text selection unit 212 searches the field-specific learning texts 27 and, for each field, selects the phrases that include the specified high appearance frequency words (condition-satisfying phrases). As shown in FIG. 5, the text selection unit 212 also creates lists 215 of the selected condition-satisfying phrases (referred to hereinafter as "condition-satisfying phrase lists") on a field-by-field basis, and stores the created lists in the identification information storage unit 32. FIG. 5 is a diagram showing an example of condition-satisfying phrase lists of this embodiment of the present invention.

The creation processing unit 213 first acquires the condition-satisfying phrases for each of the fields from the identification information storage unit 32. Next, the creation processing unit 213 creates a language model using the acquired condition-satisfying phrases as the learning text. Specifically, the creation processing unit 213 obtains the learning text by combining the acquired condition-satisfying phrases such that the percentage is the same for each field.

The language model created here is the identification language model 25. The creation processing unit 213 stores the created identification language model 25 in the identification information storage unit 32.

Also, as shown in FIG. 2, in the present embodiment, the terminal 10 used by the user 50 includes a speech detection unit 11 and a recognition result display unit 12. Specifically, the terminal 10 is an information terminal that has a calling function, such as a personal computer (PC), a smartphone, or a mobile phone.

The speech detection unit 11 detects speech intervals in speech when the user 50 speaks a phrase that is to be recognized toward the terminal 10. The user 50 then indicates the end of the speaking of the phrase that is to be recognized by pressing a recognition end button, for example, and then the speech detection unit 11 transmits the speech data of the detected speech to the speech recognition apparatus 20 in a stream via a network 40 such as the Internet or a LAN. Alternatively, the speech detection unit 11 can generate a speech file from the speech data of the speech and transmit the generated speech file to the speech recognition apparatus 20.

The speech recognition unit 22 receives the speech data from the terminal 10 and, as described above, then first performs speech recognition using a speech recognition engine that applies the identification language model 25, and acquires a recognition result text and confidences for the words in the recognition result text. The speech recognition unit 22 then sends the acquired recognition result text and confidences for the words in the recognition result text to the field determination unit 23.

The field determination unit 23 acquires the recognition result text and the confidences for the words in the recognition result text from the speech recognition unit 22, and then accesses the identification information storage unit 32 and acquires the appearance frequency lists 214 from it.

Next, the field determination unit 23 compares the words included in the recognition result text with the appearance frequency lists 214 for the various fields, specifies the appearance frequency list 214 that includes the most words whose confidences are greater than or equal to a set value, and determines that the field of the specified appearance frequency list 214 is the field of the input speech. The field determination unit 23 then sends the determination result to the language model reconstruction unit 24.

At this time, the field determination unit 23 may place a restriction on the words in the appearance frequency lists. For example, the field determination unit 23 may compare the words whose confidences are greater than or equal to the set value in the recognition result text with the words at ranks higher than or equal to a set value in the appearance frequency lists for the various fields, and determine that the field that has the highest number of matching words is the field of the input speech. Note that the set value for the confidence and the set value for the rank are set such that the determination result is appropriate.

The language model reconstruction unit 24 acquires the determination result from the field determination unit 23, specifies the field based on the determination result, and acquires the language model in the specified field from the field-specific information storage unit 33. The language model reconstruction unit 24 also acquires condition-satisfying phrases that include matching terms according to the comparison performed by the field determination unit 23, from the condition-satisfying phrase lists 215 for the fields other than the specified field, which are stored in the identification information storage unit 32.

The language model reconstruction unit 24 then adds the acquired condition-satisfying phrases, as learning text, to the language model acquired from the field-specific information storage unit 33, and reconstructs that language model. Accordingly, the language model in the field determined to be the field of the input speech is customized and stored in the customized information storage unit 29 as the customized language model 29.

After the customized language model 29 is created, the speech recognition unit 22 again executes speech recognition using a recognition engine that applies the customized language model 29. The speech recognition unit 22 then transmits the recognition result text to the terminal 10 via the network 40.

As a result, the recognition result display unit 12 of the terminal 10 displays the received recognition result text on the screen of a display panel (not shown). The user 50 can therefore check the result of the speech recognition.

Also, in the present embodiment, after the end of the processing in which the speech recognition unit 22 executes speech recognition using the customized language model 29, the language model reconstruction unit 24 can delete the customized language model 29 from the customized information storage unit 34.

Apparatus Operations

Next, operations performed by the speech recognition apparatus 20 of this embodiment of the present invention will be described with reference to FIGS. 6 and 7. In the present embodiment, the speech recognition apparatus 20 executes identification language model creation processing as preliminary preparation, and then speech recognition processing. These processes will therefore be described separately.

Note that in the present embodiment, the speech recognition method is carried out by operating the speech recognition apparatus 20. Accordingly, the following description of operations performed by the speech recognition apparatus 20 will be a substitute for the description of the speech recognition method of the present embodiment. Also, FIGS. 2 to 5 will be referenced as necessary.

Identification Language Model Creation Processing

First, processing for creating the identification language model 25 will be described with reference to FIG. 6. FIG. 6 is a flowchart showing operations in identification language model creation processing performed by the speech recognition apparatus according to this embodiment of the present invention. Also, in the present embodiment, the processing shown in FIG. 6 for creating the identification language model 25 is carried out if an update such as the addition, deletion, or modification of a language model occurs in the field-specific language model 26.

Figure 6:
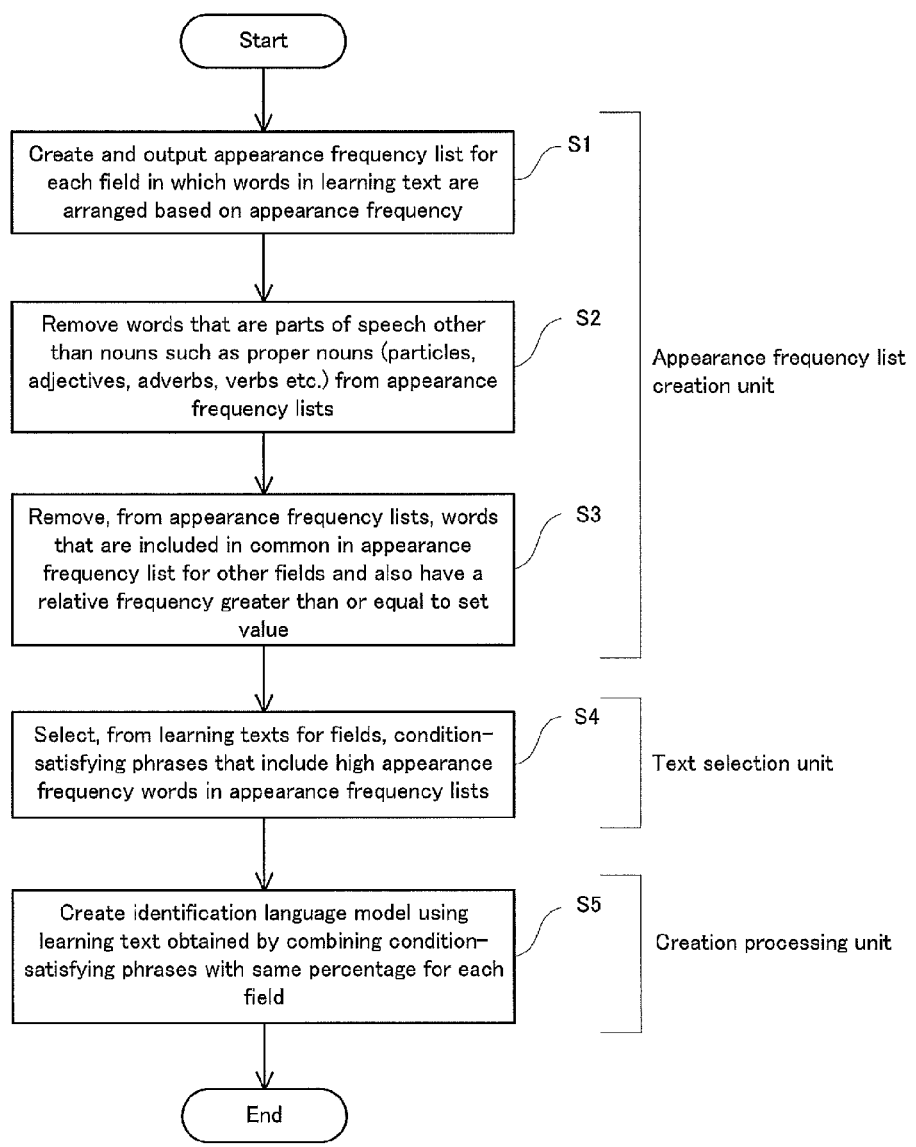
FIG. 6 is a flowchart showing operations in identification language model creation processing performed by the speech recognition apparatus according to the embodiment of the present invention.

As shown in FIG. 6, firstly, the appearance frequency list creation unit 211 generates appearance frequency lists 214 in which the words in the learning texts for the various fields are arranged based on their appearance frequencies, based on the field-specific appearance frequency information 28 that was output in the process of creating the field-specific language models 26 (step S1). The appearance frequency list creation unit 211 also outputs the created appearance frequency lists 214 to the identification information storage unit 32 for storage therein.

Next, from among the words in the stored appearance frequency lists 214 for the various fields, the appearance frequency list creation unit 211 removes words that are parts of speech other than nouns such as proper nouns (e.g., particles, adjectives, adverbs, and verbs) from the appearance frequency lists 211 (step S2).

Next, from among the words in the stored appearance frequency lists 214 for the various fields, the appearance frequency list creation unit 211 also removes, from the appearance frequency lists for the various fields, the words that are included in common in the appearance frequency lists for the various fields and also have relative frequencies that are greater than or equal to a set value (step S3).

Next, the text selection unit 212 specifies high appearance frequency words in the appearance frequency lists 214 for the various fields, and selects the condition-satisfying phrases that include the specified high appearance frequency words in the field-specific learning texts 27 (step S4). As shown in FIG. 5, the text selection unit 212 creates a condition-satisfying phrase list 215 for each field, and stores them in the identification information storage unit 32.

Next, the creation processing unit 213 acquires the condition-satisfying phrases for the various fields that were selected in step S4, combines the acquired condition-satisfying phrases such that the percentages of the fields are the same, and creates the identification language model 25 using the combined condition-satisfying phrases as the learning text (step S5). The processing for creating the identification language model 25 ends after the execution of step S5.

Speech Recognition Processing

Next, speech recognition processing will be described with reference to FIG. 7. FIG. 7 is a flowchart showing operations in speech recognition processing performed by the speech recognition apparatus according to the embodiment of the present invention. In the present embodiment, the speech recognition processing shown in FIG. 7 is carried out each time speech is received from the terminal 10.

Figure 7:
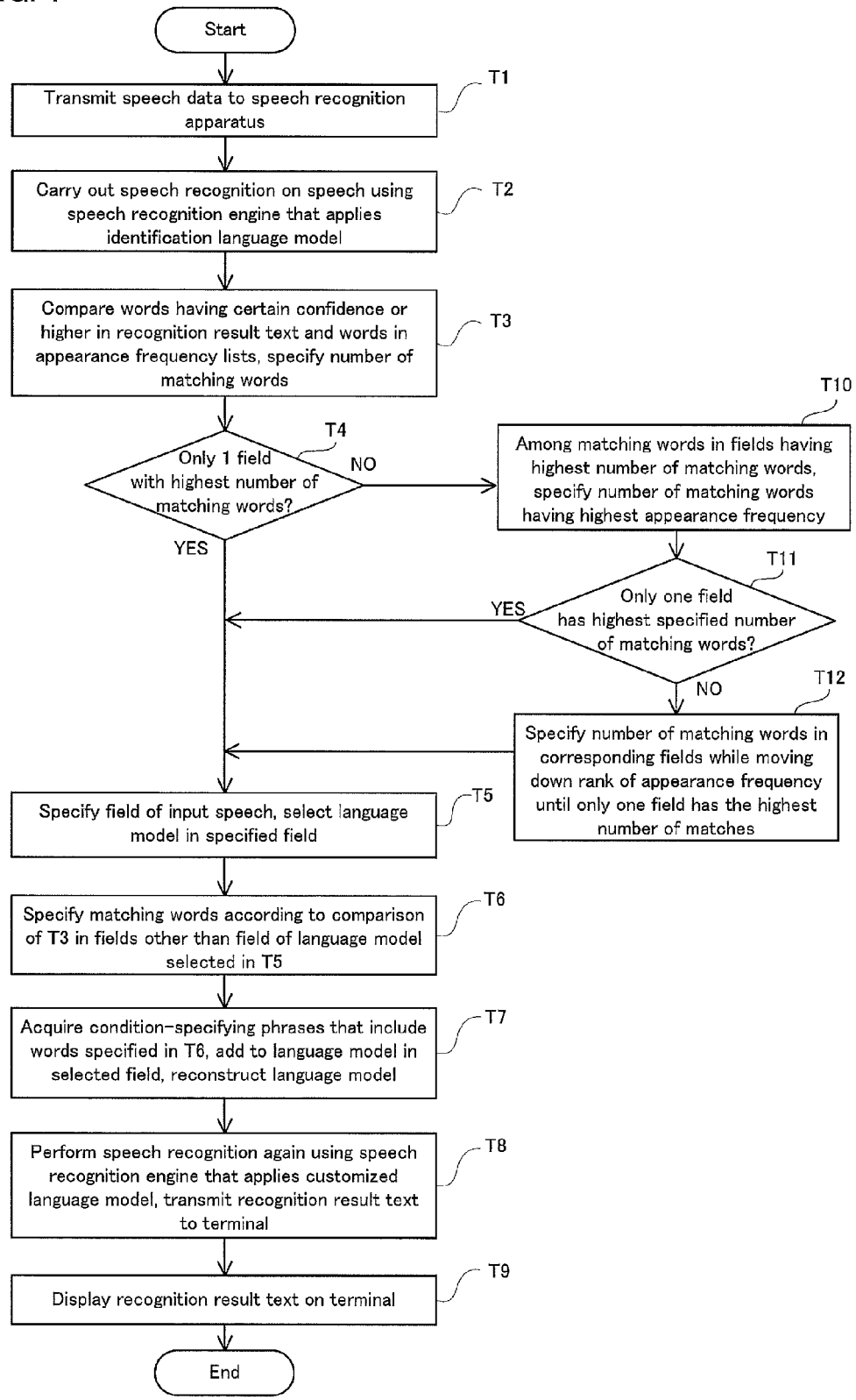
FIG. 7 is a flowchart showing operations in speech recognition processing performed by the speech recognition apparatus according to the embodiment of the present invention.

As shown in FIG. 7, firstly, the user 50 speaks a phrase that is to be recognized toward the terminal 10, and then the speech detection unit 11 of the terminal 10 detects the speech, and transmits speech data of the detected speech to the speech recognition apparatus 20 in a stream (step T1). Alternatively, in step ST1, the terminal 10 can transmit a speech file generated based on the speech data of the speech to the speech recognition apparatus 20.

Next, the speech recognition unit 22 of the speech recognition apparatus 20 receives the speech data from the terminal 10, and then carries out speech recognition on the speech data using a speech recognition engine that applies the identification language model 25 (step T2). In step T2, the speech recognition unit 22 also outputs a recognition result text and confidences for the words in the recognition result text to the field determination unit 23.

Next, the field determination unit 23 acquires the recognition result text and the confidences for the words in the recognition result text from the speech recognition unit 22, and then accesses the identification information storage unit 32 and acquires the appearance frequency lists 214 from it. The field determination unit 23 then references the words included in the recognition result text and the appearance frequency lists 214 for the various fields, compares the words whose confidences are greater than or equal to a set value in the recognition result text with the words in the appearance frequency lists 214 on a field-by-field basis, and specifies the number of matching words for each field (step T3).

Next, the field determination unit 23 determines whether only one field has the highest number of matching words based on the result of step T3 (step T4).

If the result of the determination of step T4 is that only one field has the highest number of matching words, the field determination unit 23 determines that the field having the highest number of matching words is the field of the input speech, and selects the language model in that field (step T5).

However, if the result of the determination of step T4 is that not only one field has the highest number of matching words, the field determination unit 23 specifies the number of matches between the words having the highest appearance frequency among the matching words for each of the fields that have the highest number of matching words (step T10).

Next, the field determination unit 23 determines whether only one field has the highest number of specified matches based on the result of step T10 (step T11).

If the result of the determination of step T11 is that only one field has the highest number of specified matches, the field determination unit 23 executes step T5 for determining that the field having the highest number of matches specified in step T10 is the field of the input speech. The field determination unit 23 then selects the language model in that field.

However, if the result of the determination of step T11 is that not only one field has the highest number of specified matches (i.e., more than one such field exists), the field determination unit 23 specifies the number of matches between words in the corresponding fields according to step T10 while moving down the rank of the appearance frequency used as the reference until only one field has the highest number of matching words (step T12).

Next, after executing step T12, the field determination unit 23 then executes step T5, in which it determines that the field having the highest number of matching words when there is only one such field is the field of the input speech. The field determination unit 23 then selects the language model in that field.

Next, after step T5 is executed, the matching words that were specified in step T3 are specified by the language model reconstruction unit 24 in the fields other than the field of the language model that was selected in step T4 (step T6).

Next, the language model reconstruction unit 24 acquires, from the condition-satisfying phrase list 215, condition-satisfying phrases that include the words specified in step T6 in the fields other than the field of the language model that was selected in step T4. The language model reconstruction unit 24 then adds the acquired condition-satisfying phrases, as learning text, to the language model that was selected in step T4, and reconstructs that language model (step T7).

Next, the speech recognition unit 22 again executes speech recognition using a speech recognition engine that applies the customized language model 29 that was reconstructed in step T6 (step T8). In step T8, the speech recognition unit 22 also transmits the recognition result text to the terminal 10.

After receiving the recognition result text that was transmitted in step T8, the recognition result display unit 12 of the terminal 10 displays the received recognition result text on the screen of the display panel (not shown) (step T9). The user 50 can therefore check the result of the speech recognition.

As described above, according to the present embodiment, even if the field of input speech is unknown, the field of the input speech can be identified automatically, thus making it possible to select a language model in an appropriate field and improve recognition accuracy. The present embodiment also makes it possible to customize the selected language, thereby enabling further improvement in recognition accuracy. Furthermore, with the present embodiment, there is no need to operate multiple speech recognition engines at the same time, thus reducing the processing load borne by the speech recognition apparatus 20.

Also, with the present embodiment, in place of steps T6 to T8, the speech recognition unit 22 may execute a step of executing speech recognition on the input speech using the language model that was selected in step T4. This aspect improves the processing speed and is thus useful in cases where importance is placed on the processing speed and throughput.

Furthermore, since the speech recognition apparatus 20 of the present embodiment includes a function for identifying the field of the input speech, it can be employed in the classification of input speech and the like. In this case, the fields to be classified may be set arbitrarily (e.g., dialects, services, or industries such as finance and medicine), and classification axis setting can be performed freely.

Also, with the speech recognition apparatus 20 of the present embodiment, a recognition engine that applies the identification language model and a recognition engine that applies a field-specific language model can be operated in parallel. In this case, a configuration is possible in which when a certain value reaches a certain threshold value or higher as a result of the recognition engine that applies the identification language model, there is a dynamic switch to the field corresponding to that threshold value.

As one specific example, after speech recognition is executed by the recognition engine that applies the identification language model, it is assumed that the number of matching words is greater than or equal to a threshold value in step T3. In this case, the speech recognition unit 20 specifies the field in which the number of words is greater than or equal to the threshold value, and executes speech recognition using a recognition engine that applies the language model in the specified field.

Applications

Applications of the speech recognition apparatus 20 of the present embodiment will be described below. The following first describes cases where, for example, the speech recognition apparatus is used to perform speech recognition on customer speech at a call center for receiving inquiries from customers regarding various topics, is used to perform collective speech recognition on speech files in multiple fields, and is used when the field of input speech is unknown in use in a cloud model.

Figure 8:
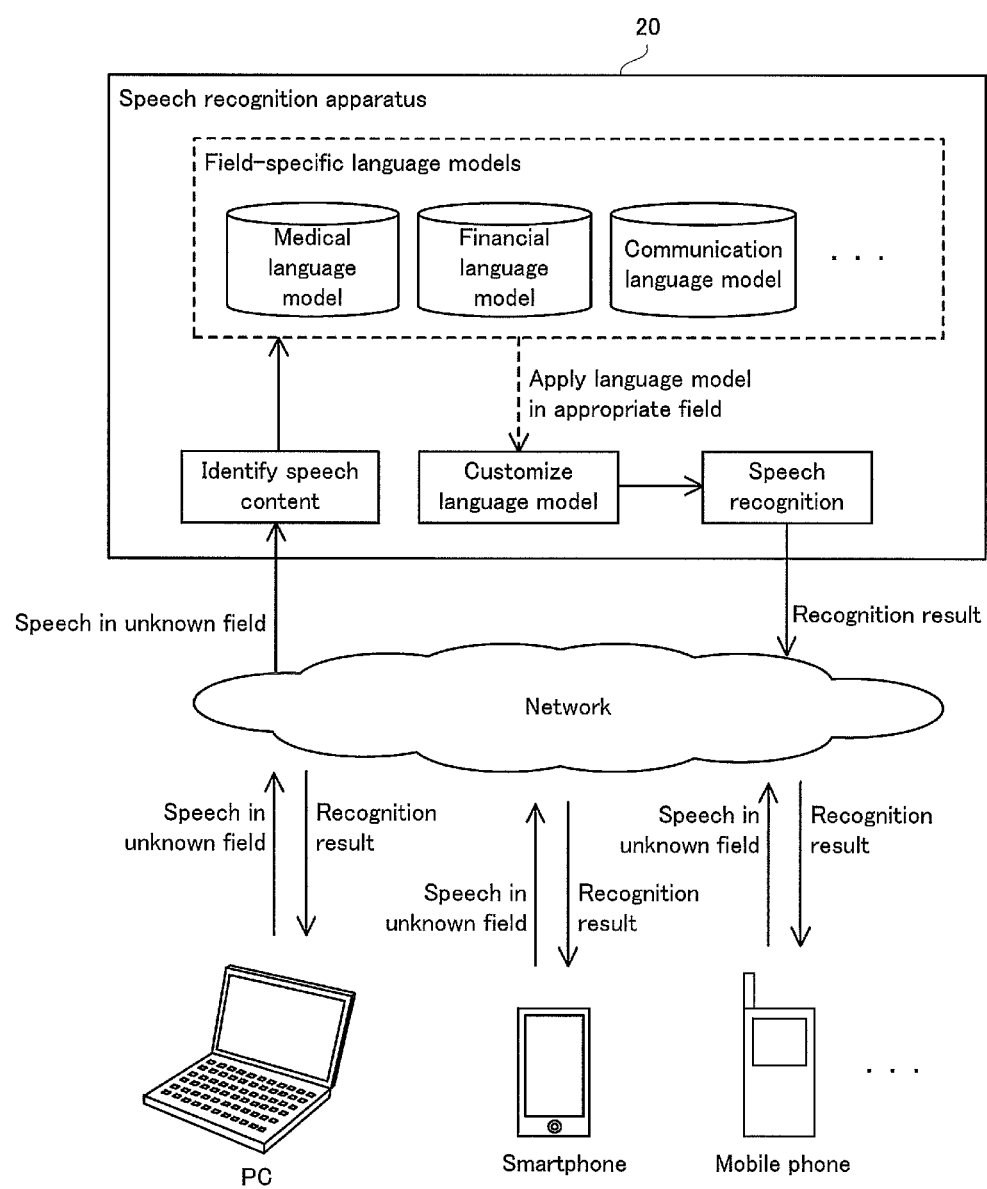
FIG. 8 is a diagram showing an example of the case where the speech recognition apparatus according to the embodiment of the present invention is used in a cloud model.

These applications will be described below with reference to FIG. 8. FIG. 8 is a diagram showing an example of the case where the speech recognition apparatus of this embodiment of the present invention is used in a cloud model. In the example of FIG. 8, the speech recognition apparatus 20 is used in a cloud model and receives speech data from various information terminals such as a personal computer, a smartphone, and a mobile phone. After receiving the speech data, the speech recognition apparatus 20 specifies the field of the speech based on the speech data, and executes speech recognition. Subsequently, the speech recognition apparatus 20 transmits the recognition result to the information terminal that transmitted the speech data.

Program

A program of the present embodiment needs only be a program for causing a computer to execute steps S1 to S5 shown in FIG. 6 and steps T2 to T8 and T10 to T12 shown in FIG. 7. The speech recognition apparatus 20 and the speech recognition method of the present embodiment can be realized by installing this program in a computer and executing it.

Also, in the above-described case, the CPU (Central Processing Unit) of the computer performs processing while functioning as the identification language model creation unit 21, the speech recognition unit 22, the field determination unit 23, and the language model reconstruction unit 24. Furthermore, a storage apparatus such as a hard disk included in the computer functions as the acoustic model storage unit 31, the identification information storage unit 32, the field-specific information storage unit 33, and the customized information storage unit 34.

Figure 9:
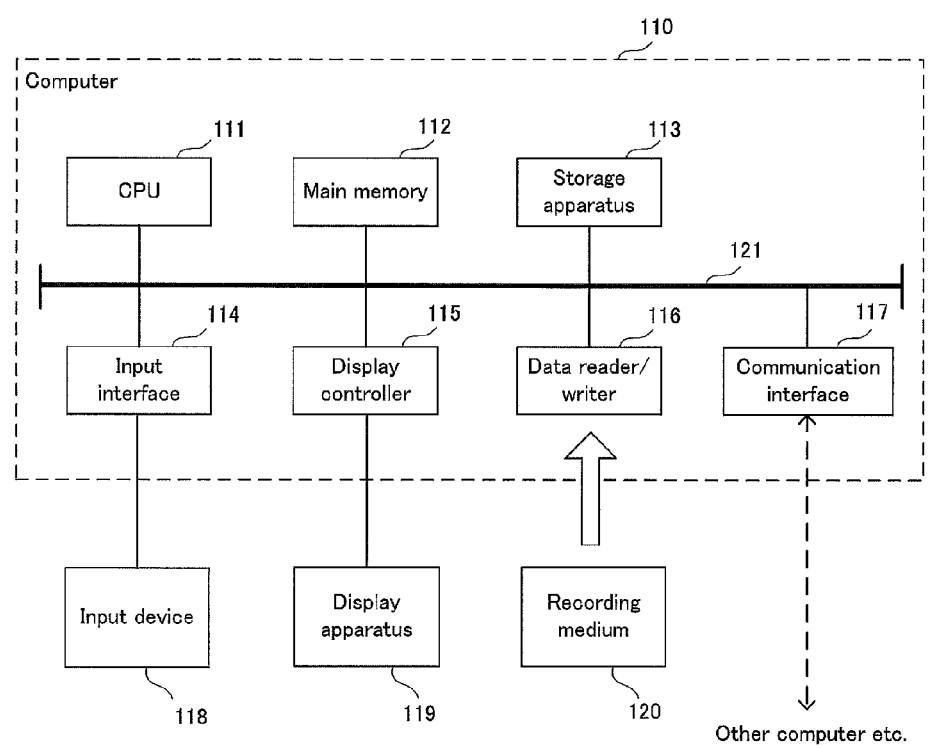
FIG. 9 is a block diagram showing an example of a computer for realizing the speech recognition apparatus according to the embodiment of the present invention.

The following describes a computer for realizing the speech recognition apparatus 20 by executing the program of this embodiment with reference to FIG. 9. FIG. 9 is a block diagram showing an example of a computer for realizing the speech recognition apparatus of this embodiment of the present invention.

As shown in FIG. 9, a computer 110 includes a CPU 111, a main memory 112, a storage apparatus 113, an input interface 114, a display controller 115, a data reader/writer 116, and a communication interface 117. These units are connected via a bus 121 so as to be able to perform data communication with each other.

The CPU 111 deploys the program (code) of the present embodiment that is stored in the storage apparatus 113 to the main memory 112, and carries out various types of operations by executing instructions of the program in a predetermined sequence. The main memory 112 is typically a volatile storage apparatus such as a DRAM (Dynamic Random Access Memory). The program of the present embodiment can also be provided in the state of being recorded on a computer-readable recording medium 120. Note that the program of the present embodiment may be distributed over the Internet through a connection via the communication interface 117.

Specific examples of the storage apparatus 113 include a hard disk drive and a semiconductor storage apparatus such as a flash memory. The input interface 114 mediates data transmission between the CPU 111 and input devices 118 such as a keyboard and a mouse. The display controller 115 is connected to a display apparatus 119 and controls display performed by the display apparatus 119.

The data reader/writer 116 mediates data transmission between the CPU 111 and the recording medium 120, that is to say, reads out the program from the recording medium 120, and writes processing results obtained by the computer 110 to the recording medium 120. The communication interface 117 mediates data transmission between the CPU 111 and other computers.

Specific examples of the recording medium 120 include a general semiconductor storage device such as a CF (Compact Flash (registered trademark)) card or an SD (Secure Digital) card, a magnetic storage medium such as a flexible disk, and an optical storage medium such as a CD-ROM (Compact Disk Read Only Memory).

Part or all of the above-described embodiment can be realized by Supplementary Notes 1 to 15 below, but there is no limitation to the following description.

Supplementary Note 1

A speech recognition apparatus including:

an identification language model creation unit that selects, from learning texts for a plurality of fields for generating language models for the fields, a phrase that includes a word whose appearance frequency satisfies a set condition on a field-by-field basis, and generates an identification language model for identifying the field of input speech using the selected phrases;

a speech recognition unit that executes speech recognition on the input speech using the identification language model, and outputs text data and a confidence for each word included in the text data as a recognition result; and a field determination unit that specifies a field that includes the most words whose confidences are greater than or equal to a set value based on the text data, the confidences of the words, and the words included in the learning texts for the fields, and determines that the specified field is the field of the input speech.

Supplementary Note 2

The speech recognition apparatus of Supplementary Note 1, wherein the identification language model creation unit includes:

an appearance frequency list creation unit that, for each field, generates an appearance frequency list in which the words included in the corresponding learning text are arranged based on appearance frequency, and in which a word other than a noun and a word that appears in a plurality of learning texts for different fields have been removed;

a text selection unit that, for each field, specifies a word whose appearance frequency satisfies a set condition from the appearance frequency list, and selects a phrase that includes the specified word from the learning text; and a creation processing unit that generates the identification language model using the phrases selected for each field, wherein the field determination unit compares the words included in the text data and the appearance frequency lists for the fields, specifies an appearance frequency list that includes the most words whose confidences are greater than or equal to a set value, and determines that the field of the specified appearance frequency list is the field of the input speech.

Supplementary Note 3

The speech recognition apparatus of Supplementary Note 1 or 2, further including:

a language model reconstruction unit that acquires the phrases selected by the identification language model creation unit for each field other than the specified field, adds the acquired phrases as a learning text to the language model in the specified field, and reconstructs the language model in the specified field, wherein the speech recognition unit again executes speech recognition on the input speech using the language model reconstructed by the language model reconstruction unit.

Supplementary Note 4

The speech recognition apparatus of Supplementary Note 1 or 2, wherein a language model is prepared in advance for each of the fields, and the speech recognition unit again executes speech recognition on the input speech using the language model in the specified field from among the language models prepared in advanced.

Supplementary Note 5

The speech recognition apparatus of Supplementary Note 2, wherein the creation processing unit obtains the learning text for the identification language model by combining the phrases selected for each field such that the percentage is the same for each field.

Supplementary Note 6

A speech recognition method including the steps of (a) selecting, from learning texts for a plurality of fields for generating language models for the fields, a phrase that includes a word whose appearance frequency satisfies a set condition on a field-by-field basis, and generating an identification language model for identifying the field of input speech using the selected phrases;

(b) executing speech recognition on the input speech using the identification language model, and outputting text data and a confidence for each word included in the text data as a recognition result; and (c) specifying a field that includes the most words whose confidences are greater than or equal to a set value based on the text data, the confidences of the words, and the words included in the learning texts for the fields, and determining that the specified field is the field of the input speech.

Supplementary Note 7

The speech recognition method of Supplementary Note 6, wherein step (a) includes the steps of:

(a1) with use of the learning texts for the fields, generating, for each field, an appearance frequency list in which the words included in the corresponding learning text are arranged based on appearance frequency, and in which a word other than a noun and a word that appears in a plurality of learning texts for different fields have been removed;

(a2) for each field, specifying a word whose appearance frequency satisfies a set condition from the appearance frequency list, and selecting a phrase that includes the specified word from the learning text; and (a3) generating the identification language model using the phrases selected for each field, wherein in step (c), the words included in the text data and the appearance frequency lists for the fields are compared, an appearance frequency list that includes the most words whose confidences are greater than or equal to a set value is specified, and it is determined that the field of the specified appearance frequency list is the field of the input speech.

Supplementary Note 8

The speech recognition method of Supplementary Note 6 or 7, further including the steps of (d) acquiring the phrases selected in step (a) for each field other than the specified field, adding the acquired phrases as a learning text to the language model in the specified field, and reconstructing the language model in the specified field; and (e) again executing speech recognition on the input speech using the language model reconstructed in step (d).

Supplementary Note 9

The speech recognition method of Supplementary Note 6 or 7, wherein a language model is prepared in advance for each of the fields, and the speech recognition method further includes the step of:

(f) again executing speech recognition on the input speech using the language model in the specified field from among the language models prepared in advanced.

Supplementary Note 10

The speech recognition method of Supplementary Note 7, wherein in step (a3), the learning text for the identification language model is obtained by combining the phrases selected for each field such that the percentage is the same for each field.

Supplementary Note 11

A computer-readable recording medium having recorded thereon a program containing instructions for causing a computer to execute the following steps:

(a) selecting, from learning texts for a plurality of fields for generating language models for the fields, a phrase that includes a word whose appearance frequency satisfies a set condition on a field-by-field basis, and generating an identification language model for identifying the field of input speech using the selected phrases;

(b) executing speech recognition on the input speech using the identification language model, and outputting text data and a confidence for each word included in the text data as a recognition result; and (c) specifying a field that includes the most words whose confidences are greater than or equal to a set value based on the text data, the confidences of the words, and the words included in the learning texts for the fields, and determining that the specified field is the field of the input speech.

Supplementary Note 12

The computer-readable recording medium of Supplementary Note 11, wherein step (a) includes the steps of:

(a1) with use of the learning texts for the fields, generating, for each field, an appearance frequency list in which the words included in the corresponding learning text are arranged based on appearance frequency, and in which a word other than a noun and a word that appears in a plurality of learning texts for different fields have been removed;

(a2) for each field, specifying a word whose appearance frequency satisfies a set condition from the appearance frequency list, and selecting a phrase that includes the specified word from the learning text; and (a3) generating the identification language model using the phrases selected for each field, wherein in step (c), the words included in the text data and the appearance frequency lists for the fields are compared, an appearance frequency list that includes the most words whose confidences are greater than or equal to a set value is specified, and it is determined that the field of the specified appearance frequency list is the field of the input speech.

Supplementary Note 13

The computer-readable recording medium of Supplementary Note 11 or 12, further causing the computer to execute the steps of (d) acquiring the phrases selected in step (a) for each field other than the specified field, adding the acquired phrases as a learning text to the language model in the specified field, and reconstructing the language model in the specified field; and (e) again executing speech recognition on the input speech using the language model reconstructed in step (d).

Supplementary Note 14

The computer-readable recording medium of Supplementary Note 11 or 12, wherein a language model is prepared in advance for each of the fields, and the computer is caused to further execute the step of:

(f) again executing speech recognition on the input speech using the language model in the specified field from among the language models prepared in advanced.

Supplementary Note 15

The computer-readable recording medium of Supplementary Note 12, wherein in step (a3), the learning text for the identification language model is obtained by combining the phrases selected for each field such that the percentage is the same for each field.

According to the present invention, it is possible to identify the field that input speech is related to while suppressing an increase in the processing load. The present invention is generally applicable to systems that implement speech recognition, and is useful in cases where the field of input speech is unknown.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A speech recognition apparatus comprising:
an identification language model creation unit that selects, from learning texts for a plurality of fields for generating language models for the fields, a phrase that includes a word whose appearance frequency satisfies a set condition on a field-by-field basis, and generates an identification language model for identifying the field of input speech using the selected phrases;
a speech recognition unit that executes speech recognition on the input speech using the identification language model, and outputs text data and a confidence for each word included in the text data as a recognition result; and
a field determination unit that specifies a field that includes the most words whose confidences are greater than or equal to a set value based on the text data, the confidences of the words, and the words included in the learning texts for the fields, and determines that the specified field is the field of the input speech, wherein the identification language model creation unit comprises:

an appearance frequency list creation unit that, for each field, generates an appearance frequency list in which the words included in the corresponding learning text are arranged based on appearance frequency, and in which a word other than a noun and a word that appears in a plurality of learning texts for different fields have been removed;

a text selection unit that, for each field, specifies a word whose appearance frequency satisfies a set condition from the appearance frequency list, and selects a phrase that includes the specified word from the learning text; and a creation processing unit that generates the identification language model using the phrases selected for each field, wherein the field determination unit compares the words included in the text data and the appearance frequency lists for the fields, specifies an appearance frequency list that includes the most words whose confidences are greater than or equal to a set value, and determines that the field of the specified appearance frequency list is the field of the input speech, wherein the speech recognition apparatus further comprises a language model reconstruction unit that acquires the phrases selected by the identification language model creation unit for each field other than the specified field, adds the acquired phrases as a learning text to the language model in the specified field and reconstructs the language model in the specified field, wherein the speech recognition unit again executes speech recognition on the input speech using the language model reconstructed by the language model reconstruction unit.

2. The speech recognition apparatus according to claim 1, wherein a language model is prepared in advance for each of the fields, and the speech recognition unit again executes speech recognition on the input speech using the language model in the specified field from among the language models prepared in advanced.

3. The speech recognition apparatus according to claim 1, wherein the creation processing unit obtains the learning text for the identification language model by combining the phrases selected for each field such that the percentage is the same for each field.

4. A speech recognition method comprising the steps of:
(a) selecting by a computer, from learning texts for a plurality of fields for generating language models for the fields, a phrase that includes a word whose appearance frequency satisfies a set condition on a field-by-field basis, and generating an identification language model for identifying the field of input speech using the selected phrases;
(b) executing speech recognition by the computer on the input speech using the identification language model, and outputting text data and a confidence for each word included in the text data as a recognition result; and
(c) specifying a field by the computer that includes the most words whose confidences are greater than or equal to a set value based on the text data, the confidences of the words, and the words included in the learning texts for the fields, and determining that the specified field is the field of the input speech, wherein step (a) includes the steps of:
(a1) with use of the learning texts for the fields, generating, for each field, an appearance frequency list in which the words included in the corresponding rearranged based on appearance frequency, and in which a word other than a noun and a word that appears in a plurality of learning texts for different fields have been removed;
(a2) for each field, specifying a word whose appearance frequency satisfies a set condition from the appearance frequency list, and selecting a phrase that includes the specified word from the learning text; and
(a3) generating the identification language model using the phrases selected for each field, wherein in step (c), the words included in the text data and the appearance frequency lists for the fields are compared, an appearance frequency list that includes the most words whose confidences are greater than or equal to a set value is specified, and it is determined that the field of the specified appearance frequency list is the field of the input speech, wherein the method further comprises the steps of:
(d) acquiring the phrases selected in step (a) by the computer, for each field other than the specified field, adding the acquired phrases as a learning text to the language model in the specified field, and reconstructing the language model in the specified field; and
(e) again executing speech recognition by the computer, on the input speech using the language model reconstructed in step (d).

5. The speech recognition method according to claim 4, wherein a language model is prepared in advance for each of the fields, and the speech recognition method further includes the step of:
(f) again executing speech recognition by the computer, on the input speech using the language model in the specified field from among the language models prepared in advanced.

6. The speech recognition method according to claim 4, wherein in step (a3), the learning text for the identification language model is obtained by combining the phrases selected for each field such that the percentage is the same for each field.

7. A non-transitory computer-readable recording medium having recorded thereon a program containing instructions for causing a computer to execute the following steps:
(a) selecting, from learning texts for a plurality of fields for generating language models for the fields, a phrase that includes a word whose appearance frequency satisfies a set condition on a field-by-field basis, and generating an identification language model for identifying the field of input speech using the selected phrases;
(b) executing speech recognition on the input speech using the identification language model, and outputting text data and a confidence for each word included in the text data as a recognition result; and
(c) specifying a field that includes the most words whose confidences are greater than or equal to a set value based on the text data, the confidences of the words, and the words included in the learning texts for the fields, and determining that the specified field is the field of the input speech, wherein step (a) includes the steps of:
(a1) with use of the learning texts for the fields, generating, for each field, an appearance frequency list in which the words included in the corresponding learning text are arranged based on appearance frequency, and in which a word other than a noun and a word that appears in a plurality of learning texts for different fields have been removed;

(a2) for each field, specifying a word whose appearance frequency satisfies a set condition from the appearance frequency list, and selecting a phrase that includes the specified word from the learning text; and (a3) generating the identification language model using the phrases selected for each field, wherein in step (c), the words included in the text data and the appearance frequency lists for the fields are compared, an appearance frequency list that includes the most words whose confidences are greater than or equal to a set value is specified, and it is determined that the field of the specified appearance frequency list is the field of the input speech, wherein the program further causes the computer to execute the steps of:

(d) acquiring the phrases selected in step (a) for each field other than the specified field, adding the acquired phrases as a learning text to the language model in the specified field, and reconstructing the language model in the specified field; and (e) again executing speech recognition on the input speech using the language model reconstructed in step (d).

8. The non-transitory computer-readable recording medium according to claim 7, wherein a language model is prepared in advance for each of the fields, and the computer is caused to further execute the step of:

(f) again executing speech recognition on the input speech using the language model in the specified field from among the language models prepared in advanced.

9. The non-transitory computer-readable recording medium according to claim 7, wherein in step (a3), the learning text for the identification language model is obtained by combining the phrases selected for each field such that the percentage is the same for each field.

* * * * *